Feb. 11, 1936.  F. H. MacLAREN  2,030,307
MANUFACTURE OF POUR POINT DEPRESSORS
Filed April 10, 1935    3 Sheets-Sheet 1

INVENTOR
Frederick H. MacLaren
BY
ATTORNEY

Patented Feb. 11, 1936

2,030,307

UNITED STATES PATENT OFFICE 2,030,307

MANUFACTURE OF POUR POINT DEPRESSORS

Frederick H. MacLaren, Calumet City, Ill., assignor to Standard Oil Company, Chicago, Ill., a corporation of Indiana Application April 10, 1935, Serial No. 15,568

19 Claims. (Cl. 87—9)

This invention pertains to the preparation of pour point depressors and in particular to the pour point depressors of the condensation type prepared by the condensation of chlorinated hydrocarbons with an aromatic hydrocarbon in the presence of aluminum chloride, boron tri-chloride or other metal halide condensing agent.

Pour point depressors such as "Paraflow" purported to be made by the method described in U. S. 1,815,022, and pour point depressors known as "Pourex" prepared by the method described in U. S. 1,963,917 and U. S. 1,963,918 and my copending application Serial No. 759,728 are basically prepared by chlorinating a hydrocarbon such as petrolatum wax, Montan wax, ozokerite and preferably paraffin waxes, and condensing the chlorinated hydrocarbon with an aromatic hydrocarbon such as anthracene, diphenyl, chlorinated diphenyl, phenanthrene, coal tar residues and in particular naphthalene, in the presence of aluminum chloride.

I have found that the chlorination of paraffin wax does not occur uniformly and before all the paraffin is reacted, isomeric monochloro derivatives, dichloro and polychloro derivatives are formed. I have found that when the chlor-wax as such is chemically condensed with an aromatic hydrocarbon in the presence of aluminum chloride, the reaction product is a less effective pour point depressor than the reaction product obtained by chemically condensing particular fractions of the chlorinated wax. I have further discovered that the dichloro derivatives make more effective condensation products than do the mono chloro derivatives, and that by separating the latter from the chlorination product before chemically condensing the chlorinated wax the pour point depressing property of the condensation product is greatly enhanced, An object of this invention therefore is to prepare a more effective pour point depressor of the condensation type. Another object of the invention is to more efficiently utilize the chlorinated hydrocarbon in the preparation of condensation product pour point depressors. Still another object of this invention is to improve the yield of effective condensation type pour point depressors. Further objects of this invention will become apparent from the detailed description of my invention described in the following sections of this specification, read in connection with the drawings which form a part of this specification and whereof:

Figures 1, 2:
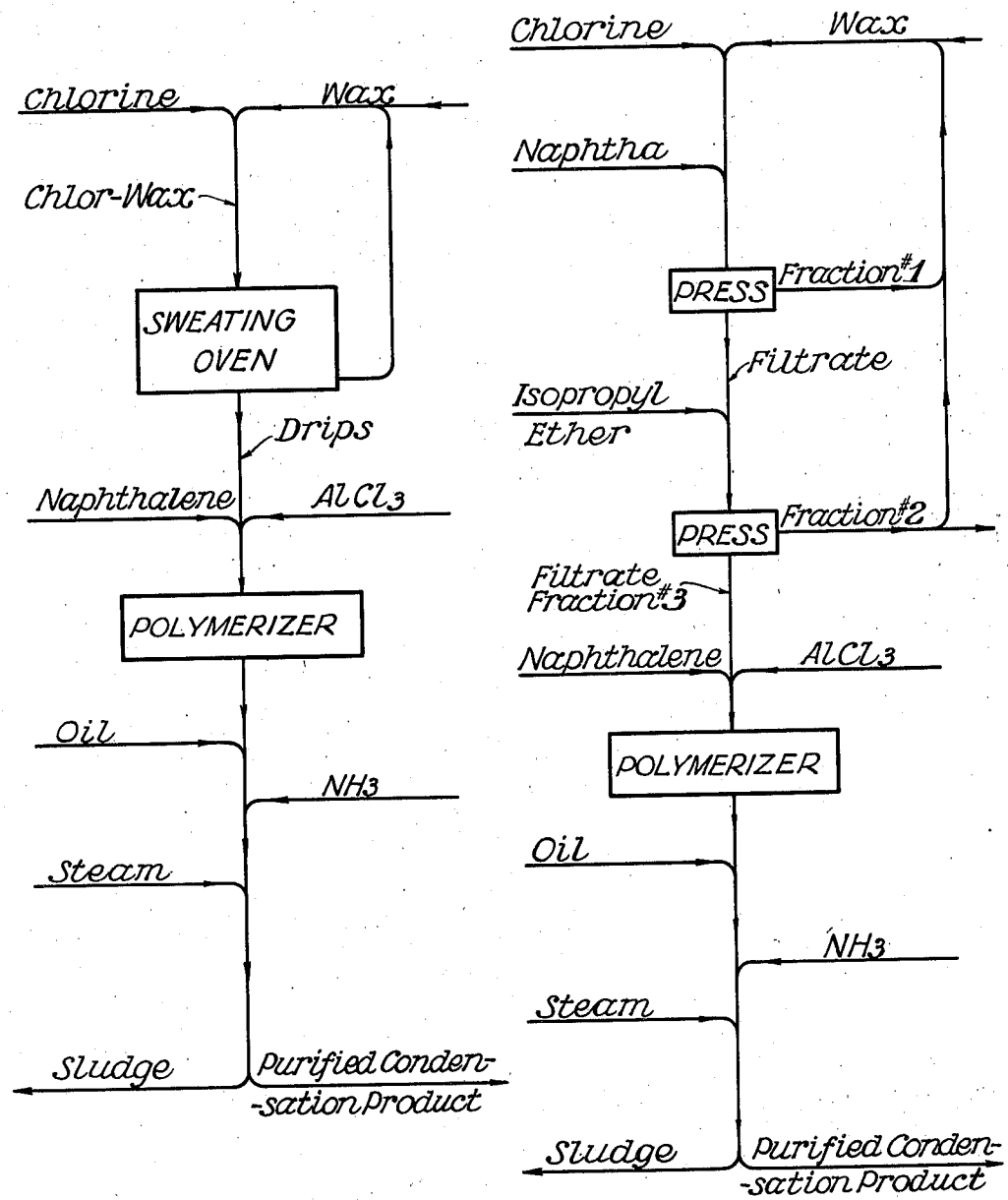
Figure 1 represents a flow diagram of one method of carrying out my invention.
Figure 2 represents a flow diagram of an alternative procedure of carrying out the invention.

For the purpose of obtaining a better understanding of this invention, the method of preparing the condensation type pour point depressors known as "Pourex" and described in U. S. Patents 1,963,917 and 1,963,918 and my copending application Serial No. 759,728 will be briefly described. It is to be understood, of course, that the preparation of the pour point depressor known as "Pourex" is given merely as an illustration, and is not to be construed as a limitation of this invention.

In the preparation of pour point depressors of the type referred to in the foregoing, melted paraffin wax of about 130° F. melting point is chlorinated with chlorine gas at a temperature of about 250° F. until the wax contains about 14% chlorine. This chlorinated product is then mixed with about 10% naphthalene (plus about 1% for volatilization loss) and the chemical condensation of the chlor-wax and naphthalene is effected by adding thereto 2–10% powdered aluminum chloride at a temperature of about 250° F. The condensation product is then diluted with a high grade pale oil having a viscosity of about 200 seconds at 100° F. Saybolt Universal, and the diluted reaction product neutralized with gaseous ammonia or with concentrated aqueous ammonia prior to dilution with oil. The neutralized condensation reaction products are then separated from the undesirable material and salts by maintaining the mixture at a temperature of 170–200° F. while agitating with air after which live steam is introduced into the mixture and the temperature rapidly raised to about 210–220° F. at which temperature the introduction of air and live steam is suspended. After settling for a short time, the oil solution of desirable condensation products is separated from salts and other undesirable material. It has been found that the purified condensation product contains a substantial amount of waxy constituents comprising monochloro derivatives of the paraffin wax and unreacted wax which are carried along throughout the condensation process. These constituents decrease the effective pour point depressing properties of the product by dilution, tend to cloud oils to which the depressor is added, and make the process as a whole less efficient and economical.

The contamination of the chlorinated wax with these undesirable waxy constituents may be eliminated by separating the former from the latter by several means, such as by sweating, fractional crystallization, solvent extraction, solvent precipitation and fractional distillation. Since the mode of conducting these procedures per se is well known in the art, they form no part of this invention except insofar as applied to the fractionation of chlorinated wax.

One method of separating the desirable chlorinated wax constituents from the undesirable constituents is by the sweating process in which a fractionation of the components of the wax results from the differences in the melting points of such constituents. In conducting a sweating operation, the wax to be treated is pumped in a molten state onto a plurality of trays located within a sweating oven, which is heated by means of steam or warm water coils. When the desired quantity of wax is introduced, the wax is solidified by the circulation of cold water thruout the oven. The temperature of the oven is then increased by the circulation of warm water thru the coils and the temperature raised to that at which the lowest melting constituent in the wax will melt progressively and be separated from the body of the wax.

It has been found that the more highly chlorinated constituents have a lower melting point than the undesirable less completely chlorinated constituents and that by submitting wax which has been treated with chlorine to a sweating operation, such as just described, the dichloro wax derivatives will be separated from the unchanged wax and monochloro constituents at a temperature below that of the melting point of the latter. That is, the dichloro derivatives will be concentrated in what is known in the art as "drips".

The application of separation by means of the sweating process to the preparation of condensation type pour point depressors will be clearly understood from the following remarks read in conjunction with Figure 1 of the accompanying drawings.

Referring to Figure 1, a paraffin wax, preferably one having a melting point of about 130–140° F., is treated in the molten state with chlorine gas after which the wax is submitted to a sweating operation. The temperature of the sweating oven is raised to about 65–75° F., at which temperature the dichloro wax derivatives are separated from the undesirable constituents and are recovered in the drips which are subsequently chemically condensed as hereinafter described. After removal of the so-called drips, the temperature of the sweating oven is further increased to that at which the undesirable waxy constituents become molten and the molten wax removed from the sweating oven. This wax and partially chlorinated wax may then be recycled to the chlorination step.

The so-called drips, comprising mainly dichloro wax derivatives are mixed with about 10% naphthalene and condensed in the presence of aluminum chloride, at a temperature of about 200° F. The condensation product is then diluted with about 20% of a high grade pale oil having a Saybolt Universal viscosity of about 200 seconds at 100° F. and neutralized with ammonia gas. The purified condensation product is then separated from the undesirable sludge by careful steaming as hereinbefore described.

Figure 3:
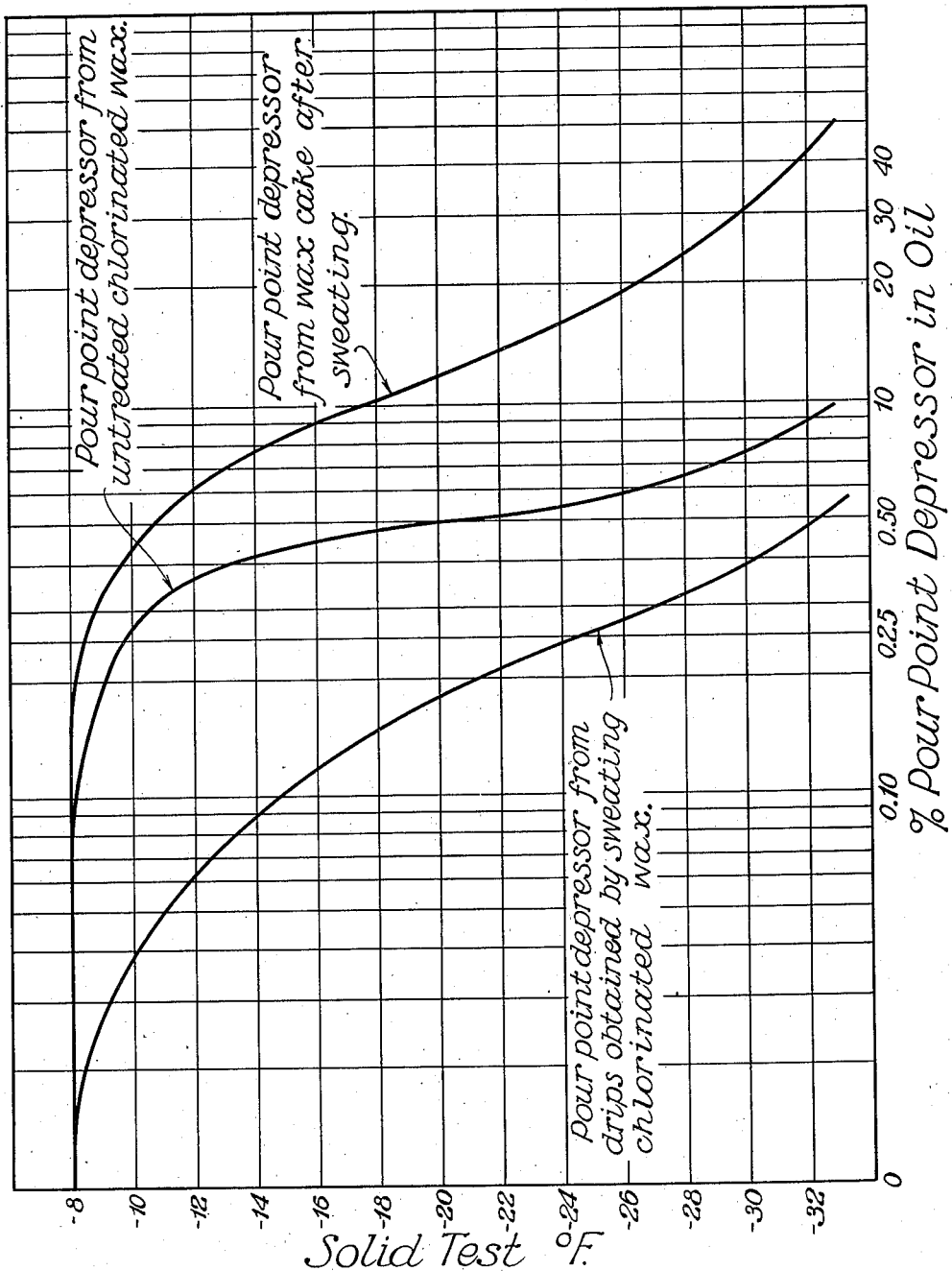
Figure 3 is a chart showing the improvement in the depressing effects of pour point depressors prepared by a preferred method of carrying out the invention.

The pour point depressor prepared in this way is greatly superior to a pour point depressor make in an identical chemical condensation procedure but using a chlorinated product from which the undesirable waxy constituents have not been separated. The relative effectiveness of the pour point depressor prepared according to this invention and that made in accordance with the prior teachings is well illustrated in Figure 3, which is a chart illustrating the pour point depressing effects of various percentages of pour point depressors prepared from the drips from such a sweating operation, a pour point depressor prepared from the wax cake remaining and a depressor made from unsweated chlorinated wax after removal of the chlorinated wax drips.

The data from which the aforementioned chart is prepared are given in the following table in which the pour point depressing effects of the above depressors in a high grade 20 S. A. E. lubricating oil having a solid point of —8° F. are tabulated.

Table I

Effect on the solid point of a high grade lubricating oil upon the addition of pour point depressors of the condensation type prepared from (1) the drips of chlorinated wax sweating, (2) unsweated chlorinated wax, and (3) the cake from chlorinated wax sweating.

| Percent pour point depressor | Drips from sweated chlorinated wax | Unsweated chlorinated wax | Cake from sweated chlorinated wax |
|---|---|---|---|
| | °F. | °F. | °F. |
| 0 | — 8 | — 8 | — 8 |
| 0.10 | —14.8 | — 8 | — 8 |
| 0.25 | —24.0 | — 9.8 | — 8.4 |
| 0.50 | —32.4 (pours) | —20.8 | —10.8 |
| 1.00 | | —32.8 (pours) | —17.8 |
| 4.00 | | | —31.6 (pours) |

The separation of chlorinated wax for the purpose of obtaining the most active constituents thereof may be accomplished equally well by the fractional crystallization of the chlorinated product. This may be effectively done by carrying out the crystallization progressively in a plurality of solvents in which the solubility of the chlorinated product varies according to the degree of chlorination. Examples of the solvent which may be used are liquefied propane, butane, naphtha, benzol, carbon tetrachloride toluene, acetone, ethylene, butylene, isopropyl alcohol, ethyl formate, methyl acetate, dimethyl ether, isopropyl ether, and mixtures of these.

A method of separating the active constituent of chlorinated wax by the fractional crystallization thereof and its application in the preparation of condensation type pour point depressors may be clearly understood from the following example which is intended to serve merely as an illustration.

Referring to Figure 2, paraffin wax having a melting point of about 130–135° F. is chlorinated at a temperature of about 200° F. until the wax contains 10–15% chlorine by weight. The chlorinated wax is then dissolved in petroleum naphtha and chilled to a temperature of about 0° F. at which temperature a portion of the chlorinated wax will crystallize out. After separating the liquid products from the crystallized material by suitable means, such as filtration, the latter may be freed of occluded naphtha by distillation and the like, and the solvent-freed material returned to the chlorination step.

The filtrate resulting from the above filtration is freed of naphtha and dissolved in isopropyl ether and chilled to a temperature of about —60° F. at which temperature a second crystallized fraction is obtained. The crystallized fraction is separated from the soluble fraction by filtration or other suitable means and the solvent removed from the crystallized material and the filtrate. The material obtained in the second crystallization fraction may be recycled to the chlorination step or may be used to make a second grade of pour point depressor or this resin may be used for other purposes. The solvent-freed filtrate obtained by the second filtration is mixed with about 10% naphthalene (plus 1% for volatilization loss) and condensed in the presence of aluminum chloride at a temperature of about 200° F., the condensation product resulting therefrom being conveniently diluted with a high grade pale oil having a Saybolt Universal viscosity of about 200 seconds at 100° F. to give about a 20% solution. The diluted reaction products are now neutralized with gaseous ammonia and the desirable material separated from the salts and other undesirable material as hereinbefore described.

In one example of this method of separation, the wax was initially chlorinated to contain 11% of chlorine. Upon analyses of the various fractions obtained from the chlorinated wax in the fractional crystallization steps the material insoluble in naphtha at 0° F., which will be designated as fraction 1, had a chlorine content of 3.6%. The material which is insoluble in isopropyl ether at −60° F. which will be designated as fraction 2 had a chlorine content of 7.5% and the material soluble in isopropyl ether at the last named temperature, which will be designated as fraction No. 3 had a chlorine content of 16.6%.

Figure 4:
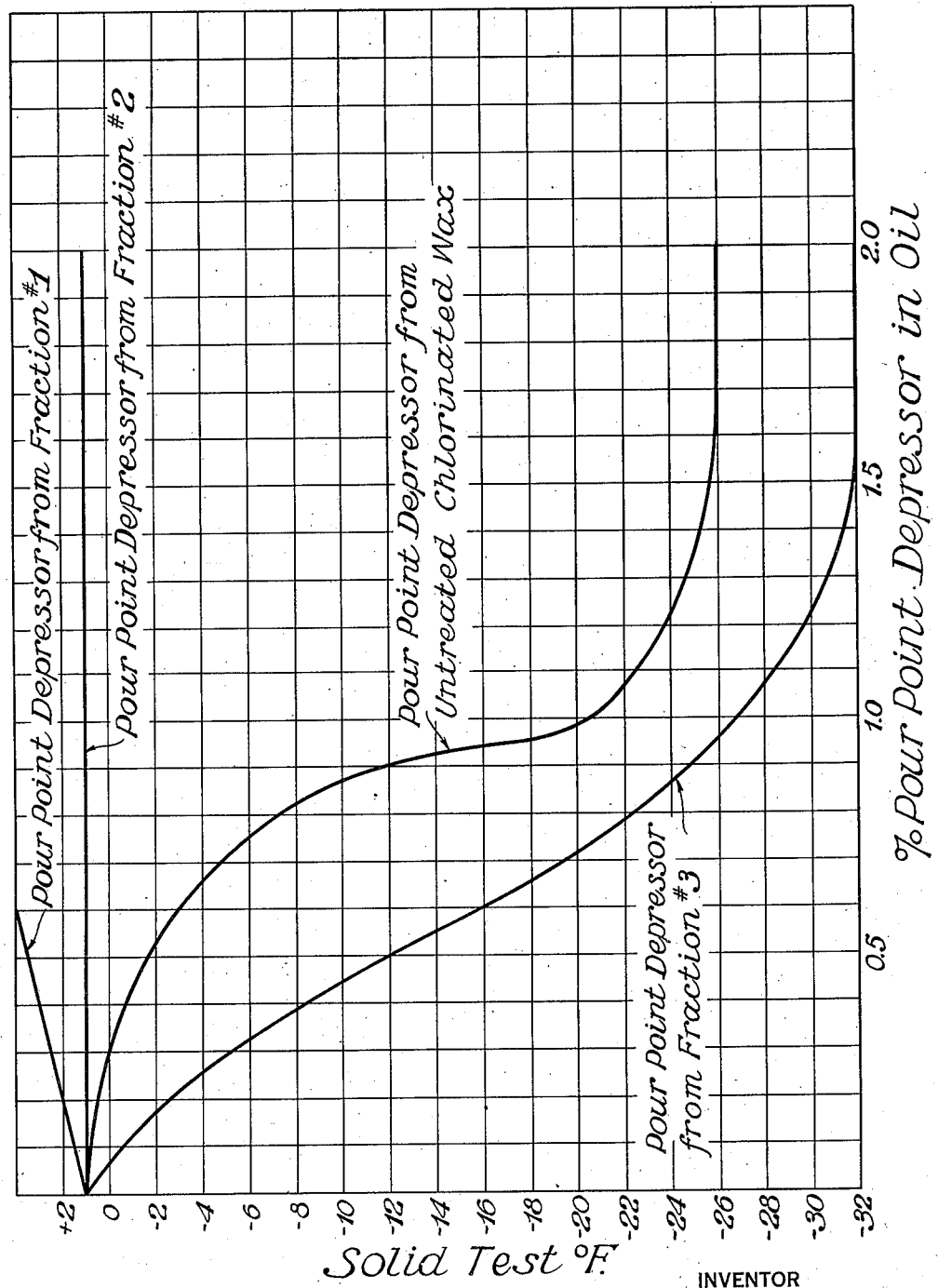
Figure 4 is a chart showing the improvement in the pour point depressing effect of pour point depressors prepared by an alternative method of practicing the invention.

When fractions Nos. 1 and 2 are condensed with naphthalene in the presence of aluminum chloride by the method just described above, the condensation reaction products obtained therefrom possess pour point depressing properties much inferior to those of the condensation product prepared from fraction No. 3. The relative effectiveness of these pour point depressors compared with a pour point depressor prepared by condensation of chlorinated wax from which the undesirable waxy constituents have not been removed is well illustrated in Figure 4, which shows the relative depressing properties of pour point depressors prepared from fractions Nos. 1 and 2. The results upon which are based the graphs of Figure 4 are tabulated in Table II.

*Table II*

Effect on the solid point of a high grade 20 S. A. E. lubricating oil upon the addition of pour point depressors of the condensation type prepared from (1) naphtha insoluble constituents at 0° F., (2) isopropyl ether insoluble constituents at −60° F., (3) isopropyl ether soluble constituents at 60° F., (4) chlorinated wax not fractionally crystallized.

| Percent | Naphtha insoluble 0° F. | Isopropyl ether insoluble at −60° F. | Isopropyl ether soluble at −60° F. | Chlorinated wax not fractionally crystallized |
|---|---|---|---|---|
|  | °F. | °F. | °F. | °F. |
| 0.0 | +1 | +1 | +1 | +1 |
| 0.50 | +4 | +2 | −12 | −2 |
| 0.75 | +8 | +2 | −22 | −4 |
| 1.00 | +7 | +1 | −25 | −22 |
| 1.25 | +10 | +1 | −29 | −25 |
| 1.50 | +13 | +1 | −32 | −26 |
| 2.00 | +15 | +1 | −32 | −26 |

These results indicate that at lower concentrations, the pour point depressor prepared from fraction No. 3 is approximately six times more effective than the pour point depressor prepared from chlorinated wax from which the undesirable constituents have not been removed.

Although two methods from which the undesirable constituents of chlorinated wax may be separated from the desirable constituents have been described in detail, equally satisfactory results may be obtained by extracting the desirable constituents from the undesirable constituents by suitable solvents. The solvents, which have been found suitable for such separation are liquefied sulfur dioxide, propylene, chlorhydrin, aniline, and ethyl alcohol.

I have also discovered that the chlorinated wax may be resolved into desirable and undesirable constituents by extracting the product with 4 to 10 volumes of liquefied normally gaseous hydrocarbons, such as butane, ethane, and propane at elevated temperatures (within about 50° of their critical temperature). Thus I have been able to cause a separation of these constituents by dissolving chlorinated wax in about eight volumes of liquefied propane at about 140° F. at which temperature the chlorinated wax completely dissolves. When the temperature was raised to 186° F., corresponding to a pressure of about 590 lbs./sq. in. absolute, separation of the more highly chlorinated fractions occurs. If the temperature of the solution is then raised to about 194° F., corresponding to a pressure of about 720 lbs./sq. in. absolute, a fraction is separated which is suitable for making superior pour test depressors.

By treating the chlorinated wax with propane at elevated temperatures, the separation is effected in the liquid-liquid phase. This is an advantage over the solid-liquid phase separation in that the need of expensive filtration apparatus and cooling systems is avoided.

The condensation product prepared with the desirable chlorinated wax constituents separated by means of solvent extraction or by the separation in liquefied propane at elevated temperatures have pour point depressing properties comparable to pour point depressors prepared from the desirable constituents of chlorinated wax separated by other methods herein described.

Since chlorinated wax contains about 25–35% of material which does not readily react with the aromatic hydrocarbons to form condensation products which are active pour point depressors, the removal of such contaminants before the condensation step materially reduces the operating cost of the condensation process and improves the yield of active pour point depressors. Furthermore, the absence of such unreacted materials in the finished pour point depressors greatly increases the pour point depressing properties thereof, making it possible to use a much smaller quantity of the pour point depressor to obtain a corresponding lowering of the solid point, of lubricating oil. Since these products are usually colored, less color is introduced into the oil.

While I have described in detail preferred embodiments of my invention, it is to be understood that it is not to be restricted thereto except as set forth in the appended claims.

I claim:

1. The improvement in the preparation of pour point depressors of the condensation type prepared by the chemical condensation of a chlorinated hydrocarbon with an aromatic hydrocarbon in the presence of aluminium chloride, which comprises separating the chlorinated hydrocarbon into a fraction comprising substantially monochloro derivatives of the chlorinated hydrocarbon, and a fraction comprising substantially dichloro derivatives of the chlorinated hydrocarbons and chemically condensing the latter with an aromatic hydrocarbon in the presence of aluminum chloride.

2. The improvement in the preparation of pour point depressors of the condensation type prepared by the chemical condensation of a chlorinated paraffin wax with an aromatic hydrocarbon in the presence of aluminum chloride, which comprises separating the chlorinated paraffin wax into a fraction comprising substantially monochloro derivatives of the chlorinated paraffin wax and a fraction comprising substantially dichloro derivatives of the chlorinated wax and chemically condensing the latter with an aromatic hydrocarbon in the presence of aluminum chloride.

3. The improvement in the preparation of pour point depressors of the condensation type prepared by the chemical condensation of a chlorinated paraffin wax with an aromatic hydrocarbon in the presence of aluminum chloride, which comprises sweating the chlorinated paraffin wax whereby a low melting fraction comprising substantially dichloro derivatives of chlorinated paraffin wax is obtained and chemically condensing the same with naphthalene in the presence of aluminum chloride.

4. The improvement in the preparation of pour point depressors of the condensation type prepared by the chemical condensation of a chlorinated paraffin wax with an aromatic hydrocarbon in the presence of aluminum chloride, which comprises fractionating the chlorinated paraffin wax into fractions comprising substantially monochloro derivatives of chlorinated paraffin wax and a fraction comprising substantially dichloro derivatives of chlorinated paraffin wax by fractional crystallization and chemically condensing the latter with naphthalene in the presence of aluminum chloride.

5. The improvement in the preparation of pour point depressors of the condensation type prepared by the chemical condensation of a chlorinated paraffin wax with an aromatic hydrocarbon in the presence of aluminum chloride, which comprises dissolving the chlorinated paraffin wax in a hydrocarbon solvent, reducing the temperature thereof to about 0° F., separating the insoluble fraction at said temperature from the soluble fraction at said temperature, reducing the temperature of the latter to about −40° F. to −80° F., separating the insoluble fraction at said last temperature from the soluble fraction at said last temperature, removing the solvent from the latter and chemically condensing the solvent-free filtrate with naphthalene in the presence of aluminum chloride.

6. The improvement in the preparation of pour point depressors of the condensation type prepared by the chemical condensation of a chlorinated paraffin wax with an aromatic hydrocarbon in the presence of aluminum chloride, which comprises dissolving the chlorinated paraffin wax in petroleum naphtha, lowering the temperature to about 0° F., separating the insoluble fraction at said temperature from the insoluble fraction at said temperature, removing the solvent from the soluble fraction, diluting the solvent-free filtrate with isopropyl ether, lowering the temperature of the isopropyl ether solution to about −60° F., separating the soluble fraction from the insoluble fraction at said temperature and removing the isopropyl ether from the filtrate and condensing the solvent-free filtrate with naphthalene in the presence of aluminum chloride.

7. The improvement in the preparation of pour point depressors of the condensation type prepared by the chemical condensation of a chlorinated paraffin wax with an aromatic hydrocarbon in the presence of aluminum chloride, which comprises dissolving the chlorinated wax in a selective solvent whereby the chlorinated wax is separated into a raffinate comprising substantially monochloro derivatives of the paraffin wax and an extract comprising substantially dichloro derivatives of the chlorinated wax, removing the solvent from the latter and condensing the same with a naphthalene in the presence of aluminum chloride.

8. The process as claimed in claim 7, wherein the selective solvent is liquefied sulfur dioxide.

9. The process as claimed in claim 7, wherein the selective solvent is propylene chlorhydrin.

10. The process as claimed in claim 7, wherein the selective solvent is aniline.

11. The improvement in the preparation of pour point depressors of the condensation type prepared by the chemical condensation of a chlorinated paraffin wax with an aromatic hydrocarbon in the presence of aluminum chloride, which comprises dissolving the chlorinated wax in 4 to 10 volumes of a liquefied normally gaseous hydrocarbon, heating the mixture to an elevated temperature high enough to cause phase separation, separating the upper phase from the lower phase, removing the solvent from the latter and condensing the same with an aromatic hydrocarbon in the presence of aluminum chloride.

12. The process as claimed in claim 11, wherein the liquefied normally gaseous hydrocarbon is propane.

13. The improvement in the preparation of pour point depressors of the condensation type prepared by the chemical condensation of a chlorinated hydrocarbon with an aromatic hydrocarbon in the presence of aluminum chloride, which comprises treating the hydrocarbon with chlorine gas until the said hydrocarbon contains about 14% chlorine, separating the chlorinated hydrocarbon into a fraction comprising substantially monochloro derivatives of the chlorinated hydrocarbon, and a fraction comprising substantially dichloro derivatives of the chlorinated hydrocarbons, heating the latter with about 10% of an aromatic hydrocarbon at a temperature from about 250 to 350° F., adding to the heated mixture about 2 to 10% powdered aluminum chloride, diluting the condensation product with a high grade pale oil having a Saybolt Universal viscosity of 100 to 250 seconds at 100° F., neutralizing the diluted mixture with anhydrous ammonia gas, heating the neutralized diluted mixture to about 180 to 200° F. while agitating the same, passing live steam into the heated diluted mixture until a temperature of about 210° to 220° F. is obtained, settling the diluted mixture and subsequently separating the desired diluted reaction products from the undesirable settled reaction products.

14. The improvement in the preparation of pour point depressors of the condensation type prepared by the chemical condensation of a chlorinated paraffin wax with an aromatic hydrocarbon in the presence of aluminum chloride, which comprises treating the paraffin wax at a temperature of about 250° F. with chlorine gas until the wax contains about 14% chlorine, separating the chlorinated paraffin wax into a fraction comprising substantially monochloro derivatives of the chlorinated paraffin wax and a fraction comprising substantially dichloro derivatives of the chlorinated wax, heating the latter with about 10% of an aromatic hydrocarbon at a temperature of about 250° to 350° F., adding to the heated mixture about 2 to 10% powdered aluminum chloride, diluting the condensation product with a high grade pale oil having a Saybolt Universal viscosity of 100 to 250 seconds at 100° F., neutralizing the diluted mixture with anhydrous ammonia gas, heating the neutralized diluted mixture to about 180 to 200° F. while agitating the same, passing live steam into the heated diluted mixture until a temperature of about 210° to 220° F. is obtained, settling the diluted mixture and subsequently separating the desired diluted reaction products from the undesirable settled reaction products.

15. The improvement in the preparation of pour point depressors of the condensation type prepared by the chemical condensation of a chlorinated paraffin wax with an aromatic hydrocarbon in the presence of aluminum chloride, which comprises treating a paraffin wax at a temperature of about 250° F. with chlorine gas until the paraffin wax contains about 14% chlorine, sweating the chlorinated paraffin wax whereby a low melting fraction comprising substantially dichloro derivatives of chlorinated paraffin wax is obtained and heating the latter with about 10% of an aromatic hydrocarbon at a temperature from 250° to 350° F., adding to the heated mixture about 2 to 10% powdered aluminum chloride, diluting the condensation product with a high grade pale oil having a Saybolt Universal viscosity of 100 to 250 seconds at 100° F., neutralizing the diluted mixture with anhydrous ammonia gas, heating the neutralized diluted mixture to about 180 to 200° F. while agitating the same, passing live steam into the heated diluted mixture until a temperature of about 210° to 220° F. is obtained, settling the diluted mixture and subsequently separating the desired diluted reaction products from the undesirable settled reaction products.

16. The improvement in the preparation of pour point depressors of the condensation type prepared by the chemical condensation of a chlorinated paraffin wax with an aromatic hydrocarbon in the presence of aluminum chloride, which comprises treating a paraffin wax at a temperature of about 250° F. with chlorine gas until the paraffin wax contains about 14% chlorine, fractionating the chlorinated paraffin wax into fractions comprising substantially monochloro derivatives of chlorinated paraffin wax and a fraction comprising substantially dichloro derivatives of chlorinated paraffin wax by fractional crystallization and heating the latter with about 10% of an aromatic hydrocarbon at a temperature from 250° to 350° F., adding to the heated mixture about 2 to 10% powdered aluminum chloride, diluting the condensation product with a high grade pale oil having a Saybolt Universal viscosity of 100 to 250 seconds at 100° F., neutralizing the diluted mixture with anhydrous ammonia gas, heating the neutralized diluted mixture to about 180 to 200° F. while agitating the same, passing live steam into the heated diluted mixture until a temperature of about 210° to 220° F. is obtained, settling the diluted mixture and subsequently separating the desired diluted reaction products from the undesirable settled reaction products.

17. The improvement in the preparation of pour point depressors of the condensation type prepared by the chemical condensation of a chlorinated paraffin wax with an aromatic hydrocarbon in the presence of aluminum chloride, which comprises treating a paraffin wax at a temperature of about 250° F. with chlorine gas until the paraffin wax contains about 14% chlorine, dissolving the chlorinated wax in a selective solvent whereby the chlorinated wax is separated into a raffinate comprising substantially monochloro derivatives of the chlorinated paraffin wax and an extract comprising substantially dichloro derivatives of the chlorinated wax, removing the solvent from the latter and heating the latter with about 10% of an aromatic hydrocarbon at a temperature from 250° to 350° F., adding to the heated mixture about 2 to 10% powdered aluminum chloride, diluting the condensation product with a high grade pale oil having a Saybolt Universal viscosity of 100 to 250 seconds at 100° F., neutralizing the diluted mixture with anhydrous ammonia gas, heating the neutralized diluted mixture to about 180 to 200° F. while agitating the same, passing live steam into the heated diluted mixture until a temperature of about 210° to 220° F. is obtained, settling the diluted mixture and subsequently separating the desired diluted reaction products from the undesirable settled reaction products.

18. The improvement in the preparation of pour point depressors of the type prepared by the chemical condensation of a chlorinated paraffin wax with an aromatic hydrocarbon in the presence of aluminum chloride, which comprises treating a paraffin wax at a temperature of about 250° F. with chlorine gas until the paraffin wax contains about 14% chlorine, dissolving the chlorinated wax in 4 to 10 volumes of a liquefied normally gaseous hydrocarbon, heating the mixture to an elevated temperature high enough to cause phase separation, separating the upper phase from the lower phase, removing the solvent from the latter and heating the latter with about 10% of an aromatic hydrocarbon at a temperature of about 250° to 350° F., adding to the heated mixture about 2 to 10% powdered aluminum chloride, diluting the condensation product with a high grade pale oil having a Saybolt Universal viscosity of 100 to 250 seconds at 100° F., neutralizing the diluted mixture with anhydrous ammonia gas, heating the neutralized diluted mixture to about 180 to 200° F. while agitating the same, passing live steam into the heated diluted mixture until a temperature of about 210° to 220° F. is obtained, settling the diluted mixture and subsequently separating the desired diluted reaction products from the undesirable settled reaction products.

19. The process as claimed in claim 18 wherein the liquefied normally gaseous hydrocarbon is propane.

FREDERICK H. MACLAREN.

DISCLAIMER 2,030,307.—*Frederick H. MacLaren*, Calumet City, Ill. MANUFACTURE OF POUR POINT DEPRESSORS. Patent dated February 11, 1936. Disclaimer filed August 8, 1938, by the assignee, *Standard Oil Company*.

Hereby enters this disclaimer to claims 1, 2, 3, 4, and 7 in said specification.

[*Official Gazette September 6, 1938.*]